US 12,450,005 B2

(12) United States Patent
Mou et al.

(10) Patent No.: US 12,450,005 B2
(45) Date of Patent: Oct. 21, 2025

(54) DATA STORAGE METHOD AND DEVICE (71) Applicant: SAMSUNG ELECTRONICS CO., LTD., Suwon-si (KR)

(72) Inventors: Siyu Mou, Xi'an (CN); Kun Dou, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/421,542

(22) Filed: Jan. 24, 2024

(65) Prior Publication Data
US 2025/0103242 A1 Mar. 27, 2025

(30) Foreign Application Priority Data
Sep. 22, 2023 (CN) .......................... 202311238767.3

(51) Int. Cl.
G06F 3/06 (2006.01)

(52) U.S. Cl.
CPC ............ *G06F 3/0658* (2013.01); *G06F 3/065* (2013.01); *G06F 3/0679* (2013.01); *G06F 3/0604* (2013.01)

(58) Field of Classification Search
CPC . G06F 3/06; G06F 2212/1016; H04L 67/1097
See application file for complete search history.

(56) References Cited

U.S. PATENT DOCUMENTS

| | | | |
|---|---|---|---|
| 7,266,556 B1 * | 9/2007 | Coates | G06F 11/2094 |
| 8,819,335 B1 | 8/2014 | Salessi et al. | |
| 9,824,006 B2 * | 11/2017 | Duran | G06F 3/0659 |
| 10,254,998 B2 | 4/2019 | Sinha et al. | |
| 11,290,535 B2 | 3/2022 | Smith et al. | |
| 11,354,039 B2 | 6/2022 | George et al. | |
| 11,363,042 B2 | 6/2022 | Kessel et al. | |
| 12,019,910 B2 * | 6/2024 | Li | G06F 3/0619 |
| 2015/0006663 A1 * | 1/2015 | Huang | H04L 67/1097 709/213 |
| 2015/0237139 A1 * | 8/2015 | Chen | G06F 3/0604 709/217 |
| 2018/0034908 A1 | 2/2018 | Li | |
| 2018/0284989 A1 * | 10/2018 | Kachare | G06F 13/28 |
| 2019/0146682 A1 * | 5/2019 | Subramanian | G06F 3/0659 711/103 |
| 2019/0266274 A1 * | 8/2019 | Olarig | G06F 3/067 |
| 2020/0293483 A1 * | 9/2020 | Haimzon | H04L 49/358 |

FOREIGN PATENT DOCUMENTS

| | | |
|---|---|---|
| CN | 108667903 B | 11/2019 |
| CN | 114416188 A | 4/2022 |

* cited by examiner

Primary Examiner — Khoa D Doan
(74) Attorney, Agent, or Firm — Sughrue Mion, PLLC (57) ABSTRACT A data storage method performed by at least one processor of an object storage device (OSD) of a storage system comprises receiving data from an external device through an Ethernet interface of an Ethernet solid state drive (SSD) of the OSD. The method further includes storing the received data in the Ethernet SSD.

15 Claims, 6 Drawing Sheets

DATA STORAGE METHOD AND DEVICE

CROSS-REFERENCE TO RELATED APPLICATIONS

This application is based on and claims priority under 35 U.S.C. § 119 to Chinese Patent Application No. 202311238767.3, filed on Sep. 22, 2023, in the China National Intellectual Property Administration, the disclosure of which is incorporated by reference herein in its entirety.

BACKGROUND

1. Field

The present disclosure relates to data storage, and more specifically, to a data storage method and device.

2. Related Art

As a unified distributed storage system, a Ceph system is a widely used system currently that is configured to offer better performance, reliability and scalability, and is supported by many cloud computing vendors.

The Ceph system may include a plurality of servers, where the server may be a monitor (or monitor node) or an object storage device (OSD) (or an OSD node). Currently, the OSD node is typically implemented in a form of a server that includes an X86 CPU, and at least one data storage device (e.g., Solid State Driver (SSD)), where the X86 CPU executes an OSD Demon corresponding to the data storage device to implement access to data.

Figure 1:
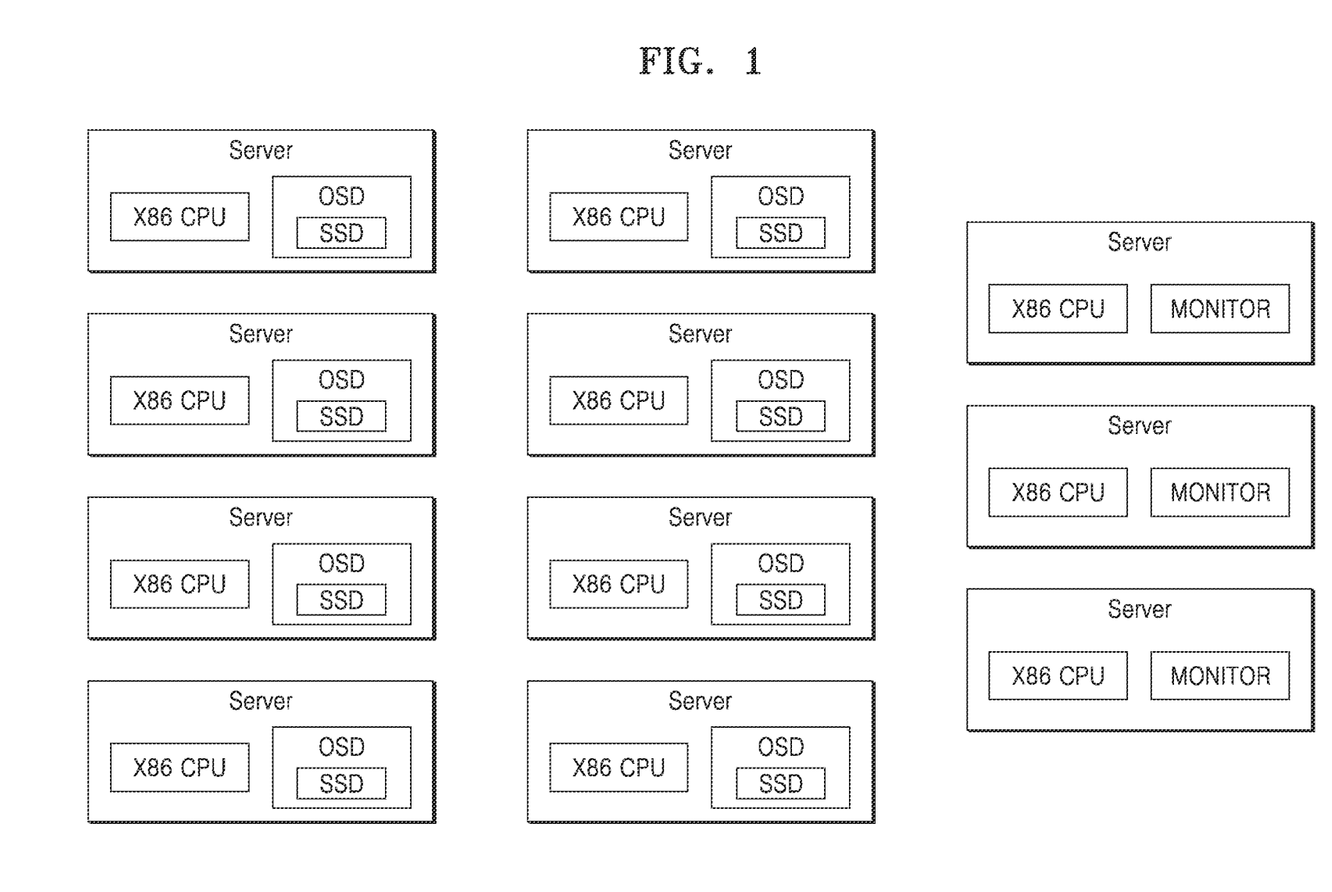
FIG. 1 is a schematic diagram illustrating an example of a cluster of servers of a Ceph system.

FIG. 1 illustrates an example of a cluster of servers of a distributed storage system such as a Ceph system.

Referring to FIG. 1, the cluster of the servers includes 3 monitor nodes and 8 OSD nodes, where each node is implemented by an X86 CPU-based server. The cluster requires approximately two 42U cabinets to be deployed, which may result in a high space cost.

In addition, one X86 CPU can typically execute a plurality of OSD Daemons. However, to perform data storage with high reliability, one OSD node typically executes only one single OSD Demon. For example, referring to FIG. 1, one OSD node includes only one SSD. Therefore, the X86 CPU of the one OSD node executes only one OSD Daemon, which results in a low hardware utilization and a high hardware cost. At the same time, a cluster of servers utilizing X86 CPUs may result in higher power costs due to high power consumptions of the X86 CPUs.

Therefore, a solution may be provided to reduce a cost of deploying a distributed storage system such as the Ceph system.

SUMMARY

The purpose of the present disclosure is to provide a data storage method and device, which may implement an OSD by embedding a processor in an Ethernet SSD to reduce a cost of deploying a Ceph system.

According to one or more embodiments, a data storage method performed by at least one processor of an object storage device (OSD) of a storage system, the method comprises: receiving data from an external device through an Ethernet interface of an Ethernet solid state drive (SSD) of the OSD; and storing the received data in the Ethernet SSD.

The storing of the received data in the Ethernet SSD comprises: processing the received data to generate processed data; storing the processed data in the Ethernet SSD; and storing metadata associated with the received data in a memory of the processor of the OSD.

The storing of the processed data in the Ethernet SSD comprises: transmitting the processed data to a controller of the Ethernet SSD that causes the Ethernet SSD to store the processed data in a storage unit of the Ethernet SSD by the controller.

The processor is an Advanced Reduced Instruction Set Computer (ARM) CPU.

The external device is another OSD or a monitor of the storage system.

The method further comprising: executing an OSD daemon corresponding to the OSD to perform at least one of data replication, data rebalancing, and heartbeat detection via the Ethernet interface.

According to one or more embodiments, an object storage device (OSD) of a storage system comprises: an Ethernet solid state drive (SSD) comprising an Ethernet interface; and a processor embedded in the Ethernet SSD and configured to: receive data from an external device through the Ethernet interface, and store the received data in the Ethernet SSD.

According to one or more embodiments, the processor is configured to: process the received data to generate processed data, store the processed data in the Ethernet SSD, and store metadata associated with the received data in a memory of the processor.

The processor is configured to transmit the processed data to a controller of the Ethernet SSD that causes the Ethernet SSD to store the processed data into a storage unit of the Ethernet SSD by the controller.

The processor is an Advanced Reduced Instruction Set Computer (ARM) CPU.

The external device is another OSD or a monitor of the storage system.

The processor is further configured to execute an OSD Daemon corresponding to the OSD to perform at least one of data replication, data rebalancing, and heartbeat detection via the Ethernet interface.

According to one or more embodiments, a non-transitory computer readable medium having instructions stored therein, which when executed by a processor of an object storage device (OSD) of a storage system, cause the processor to execute a method comprising: receiving data from an external device through an Ethernet interface of an Ethernet solid state drive (SSD) of the OSD; and storing the received data in the Ethernet SSD.

The storing of the received data in the Ethernet SSD comprises: processing the received data to generate processed data; storing the processed data in the Ethernet SSD; and storing metadata associated with the received data in a memory of the processor of the OSD.

The storing of the processed data in the Ethernet SSD comprises: transmitting the processed data to a controller of the Ethernet SSD that causes the Ethernet SSD to store the processed data in a storage unit of the Ethernet SSD by the controller.

The processor is an Advanced Reduced Instruction Set Computer (ARM) CPU.

The external device is another OSD or a monitor of the storage system.

The method further comprises: executing an OSD daemon corresponding to the OSD to perform at least one of data replication, data rebalancing, and heartbeat detection via the Ethernet interface.

BRIEF DESCRIPTION OF DRAWINGS

The above and other purposes and features of the present disclosure will become more apparent through the following descriptions made in conjunction with the figures schematically illustrating the embodiments, in which.

DETAILED DESCRIPTION

Hereinafter, various embodiments of the present disclosure are described with reference to the accompanying drawings, in which like reference numerals are used to depict the same or similar elements, features, and structures. However, the present disclosure is not intended to be limited by the various embodiments described herein to a specific embodiment and it is intended that the present disclosure covers all modifications, equivalents, and/or alternatives of the present disclosure, provided they come within the scope of the appended claims and their equivalents. The terms and words used in the following description and claims are not limited to their dictionary meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the present disclosure, it is intended that when a component (for example, a first component) is referred to as being "coupled" or "connected" with/to another component (for example, a second component), the component may be directly connected to the other component or may be connected through another component (for example, a third component).In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the present disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

The terms used herein are to describe certain embodiments of the present disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the present disclosure are not intended to be interpreted as excluding embodiments of the present disclosure.

As discussed above, a cluster of X86 CPU-based servers has high power consumption and low hardware utilization. In order to overcome at least these disadvantages that are present in the prior art, the present disclosure combines a processor and an Ethernet SSD as an OSD (or implements the OSD by embedding the processor in the Ethernet SSD) to reduce the cost of deploying a distributed storage system such as the Ceph system. As understood by one of ordinary skill in the art, the embodiments of the present disclosure are not limited to a Ceph system and may be implemented in any suitable distributed storage system known to one of ordinary skill in the art.

Figure 2:
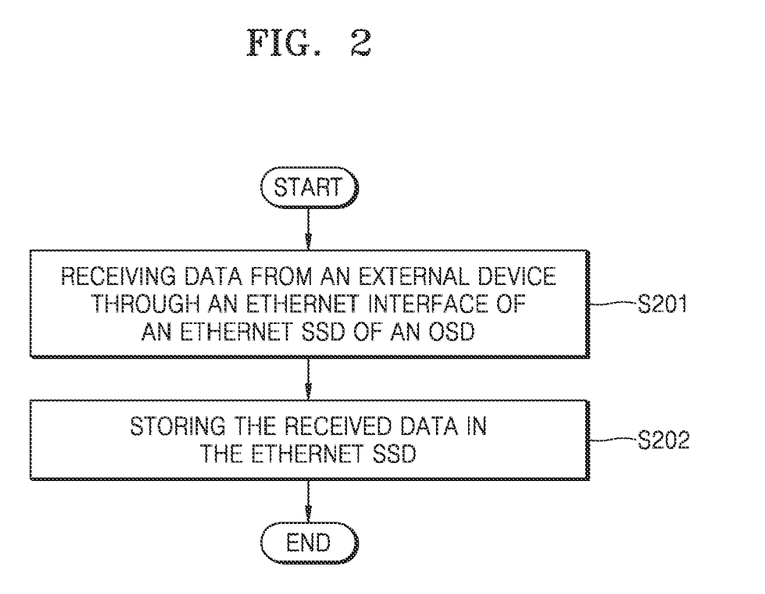
FIG. 2 illustrates a flowchart of a data storage method according to one or more embodiments of the present disclosure.

FIG. 2 illustrates a flowchart of a data storage method according to one or more embodiments of the present disclosure.

It should be understood by those skilled in the art that the data storage method described herein is performed by an OSD of the Ceph system. In one or more examples, the OSD includes an Ethernet SSD and a processor. In one or more examples, the Ethernet SSD includes an Ethernet interface. In one or more examples, the processor may be embedded in the Ethernet SSD.

Referring to FIG. 2, at operation S201, data is received from an external device via the Ethernet interface of the Ethernet SSD.

As an example, the external device is another OSD or a monitor of the Ceph system. For example, the data may be received from a monitor node, another OSD or a client.

At operation S202, the received data is stored in the Ethernet SSD.

According to one or more embodiments of the present disclosure, compared to an implementation of the OSD in a form of a server in the prior art, the OSD of the present disclosure being implemented as an Ethernet SSD with a processor embedded therein advantageously reduces the cost of deploying a distributed storage system such as the Ceph system. These reduced costs may be realized through reduced power consumption, space cost, and hardware cost.

As understood by one of ordinary skill in the art, the processor embedded in the Ethernet SSD may perform the processing of data by executing an OSD Daemon corresponding to the Ethernet SSD or the OSD.

In one or more examples, the storing of the received data in the Ethernet SSD may include processing the received data to generate processed data, and storing the processed data in the Ethernet SSD, and storing metadata associated with the received data in a memory of the processor. The metadata may be data providing information about one or more aspects of the received data such as date of creation, source of creation, last modified data, etc.

As understood by one of ordinary skill in the art, the metadata for the received data may be generated during the processing of the received data by the processor.

In one or more examples, the storing of the processed data in the Ethernet SSD includes transmitting the processed data to a controller of the Ethernet SSD that causes the controller of the Ethernet SSD to store the processed data in a storage unit (e.g., a NOT-AND (NAND) flash memory) of the Ethernet SSD by the controller.

In one or more examples, the method further includes executing an OSD daemon corresponding to the OSD (or the Ethernet SSD) to perform at least one of data replication, data rebalancing, and heartbeat detection via the Ethernet interface.

In one or more examples, the processor is an ARM CPU.

Since the ARM CPU is configured to perform a computing function for the X86 CPU-based server and the ARM CPU may take up a smaller space compared to the X86 CPU-based server, the Ceph system deployed based on the OSDs of the present disclosure may be deployed in a lightweight manner. Compared to the X86 CPU, or the X86 CPU-based server, the ARM CPU consumes less power and is cheaper. Furthermore, the computing power of the ARM CPU matches the OSD daemon, and thus, the cost of deploying the Ceph system may be reduced and the hardware utilization for the ARM CPU may approach 100%.

For ease of description, a process for the OSD storing data is described by taking the ARM CPU being the processor as an example below. However, as understood by one of ordinary skill in the art, the embodiments of the present disclosure may be implemented with any suitable processor.

Figure 3:
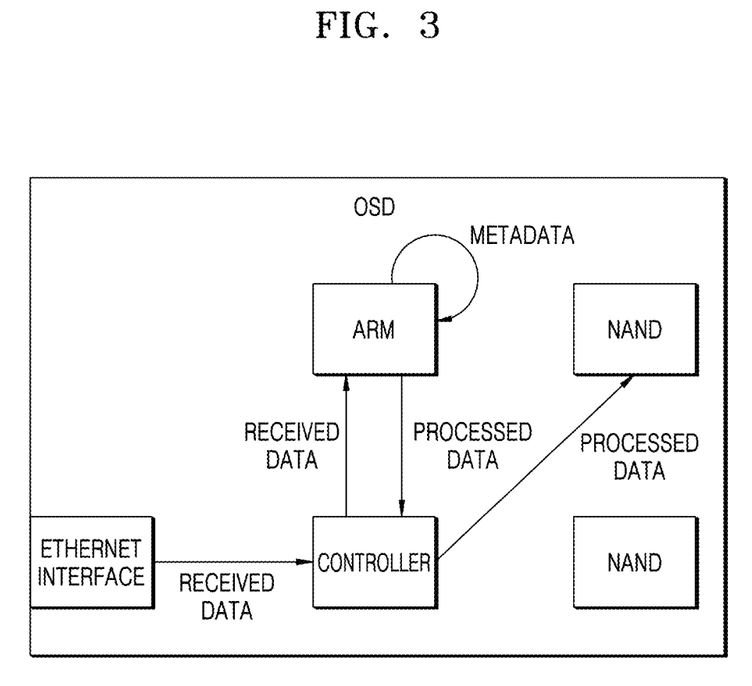
FIG. 3 illustrates a schematic diagram of a process for storing data by an OSD according to one or more embodiments of the present disclosure.

FIG. 3 illustrates a schematic diagram of a process for storing data by OSDs according to one or more embodiments of the present disclosure.

Referring to FIG. 3, the OSD may receive data from an external device via the Ethernet interface of the Ethernet SSD. The ARM CPU may process the received data, store metadata for data that is generated by the processing in a memory of the ARM CPU, and transmit the processed data to a controller of the Ethernet SSD to store the processed data in the NAND flash memory of the Ethernet SSD by the controller.

As understood by one of ordinary skill in the art, the Ethernet interface, the controller of the Ethernet SSD, and the NAND flash memory belong to the Ethernet SSD. Since the controller of the Ethernet SSD may manage an Ethernet function, the ARM CPU may directly control the controller of the Ethernet SSD to communicate with other devices (e.g., other SSDs, monitor nodes or clients) via the Ethernet interface.

Figure 4:
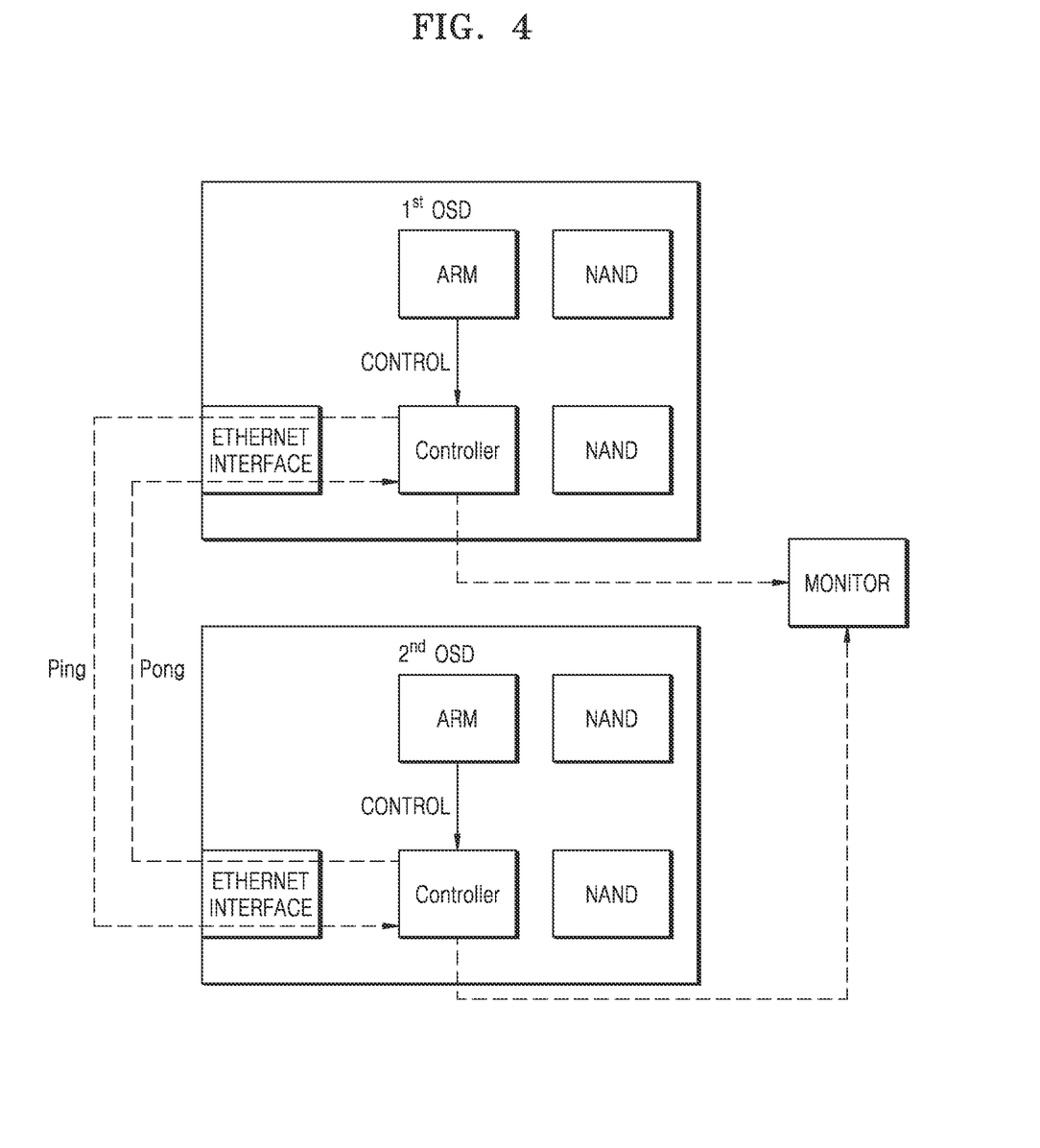
FIG. 4 illustrates a schematic diagram of a process for performing heartbeat detection by OSDs according to one or more embodiments of the present disclosure.

FIG. 4 illustrates a schematic diagram of a process for performing a heartbeat detection, or check, by OSDs.

Referring to FIG. 4, the OSD1 and OSD2 may transmit Ping/Pong messages to each other.

In one or more examples, the ARM CPU of the OSD1 may control the controller of the Ethernet SSD of the OSD1 to transmit a Ping message to the OSD2 via the Ethernet interface (or port) of the OSD1, and to monitor the Ethernet port of the OSD1. If the OSD1 does not receive a Pong message from the OSD2 after elapse of a predetermined period of time, the OSD2 is marked as down, and information indicating that the OSD2 is down is reported to a monitor node. The monitor node marks the OSD2 as down after the monitor node receives the information.

Accordingly, the ARM CPU of the OSD2 may control the controller of the Ethernet SSD of OSD2 to transmit a Ping message to OSD1 via the Ethernet port (or interface) of the OSD2 and monitor the Ethernet port of the OSD2. If the OSD2 does not receive a Pong message from the OSD1 after elapse of a predetermined period of time, the OSD1 is marked as down, and information indicating that the OSD1 is down is reported to the monitor node. The monitor node marks the OSD1 as down after receiving the information.

As understood by one of ordinary skill in the art, only OSDs within the same Placement Group (PG) transmit Ping/Pong messages to each other.

Figure 5:
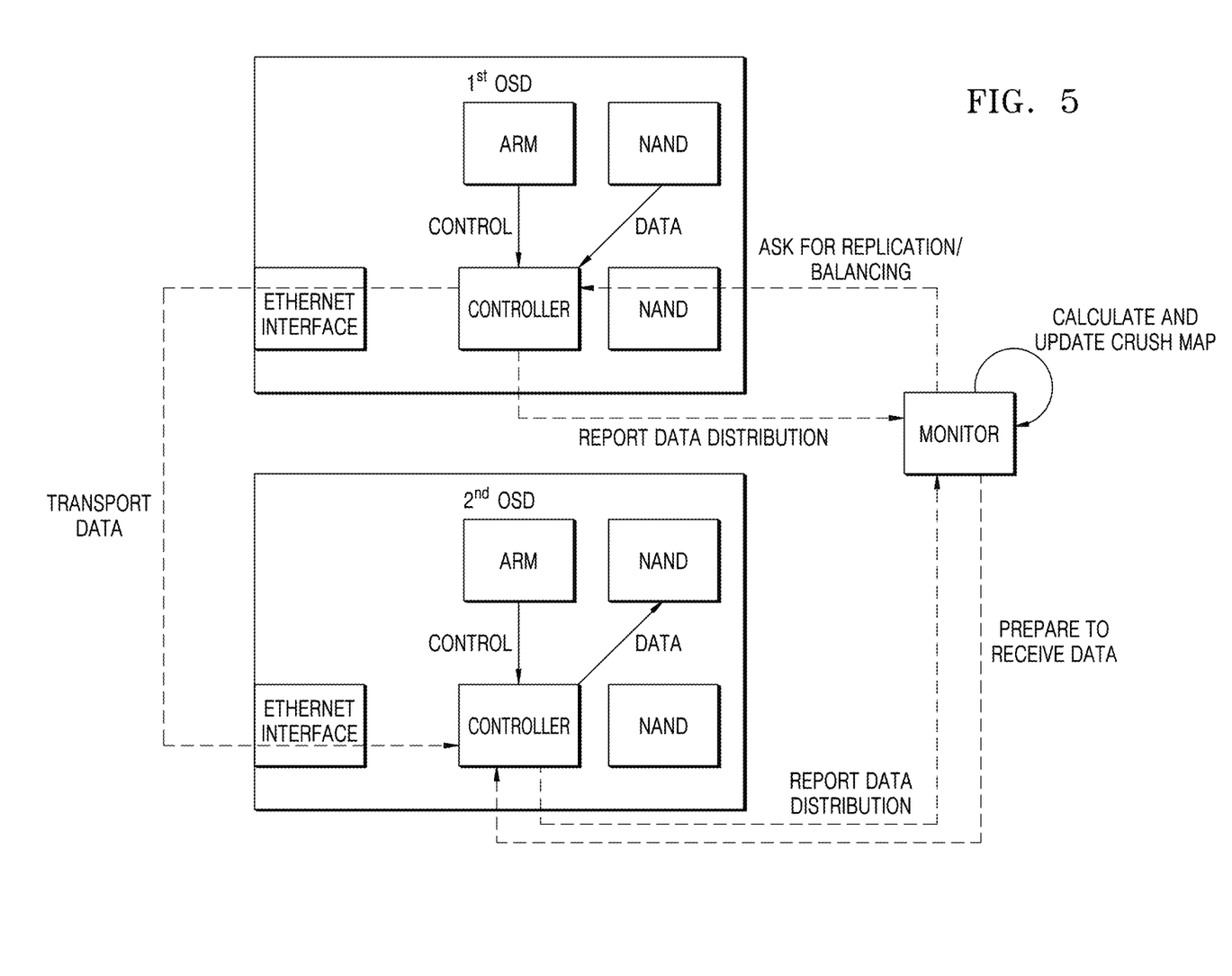
FIG. 5 illustrates a schematic diagram of a process for performing data replication and data balancing by OSDs according to one or more embodiments of the present disclosure.

FIG. 5 illustrates a schematic diagram of a process for performing data replication and data balancing by the OSD according to one or more embodiments of the present disclosure.

Referring to FIG. 5, the monitor (or monitor node) may request for OSDs to report data distribution information, and the monitor calculates and updates a Crush Map based on the received information by using a Crush algorithm. The monitor may determine a source OSD and a destination OSD for performing data replication and/or data balancing based on the Crush MAP.

For example, the OSD1 in FIG. 5 may be the source OSD, and the OSD2 may be the destination OSD. In one or more examples, the monitor may transmit a command for data replication and/or data balancing to the OSD1, and a command for preparing the OSD2 to receive data. In one or more examples, the OSD1 transmits the data that needs to be replicated and/or balanced from the NAND flash of the OSD1 to the OSD2 based on the monitor's command, and the OSD2 prepares to receive the data transmitted from the OSD1 and stores the received data into the NAND flash of OSD2 after receiving the data.

The data storage methods according to one or more embodiments of the present disclosure have been described above with reference to FIGS. 1-5, and an OSD of a Ceph system according to one or more embodiments of the present disclosure is described below with reference to FIG. 6.

Figure 6:
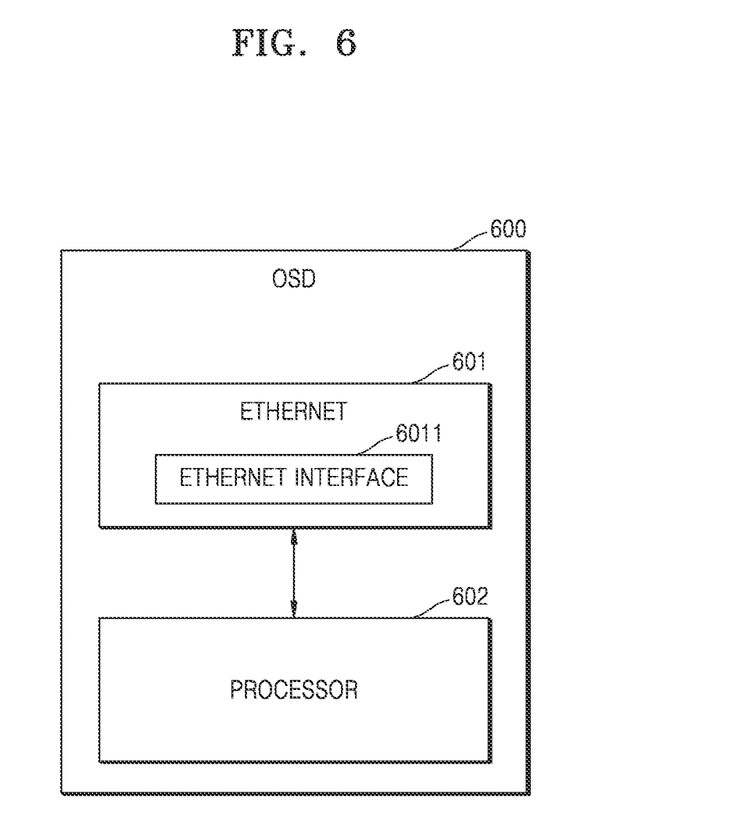
FIG. 6 illustrates a block diagram of a structure of an OSD according to one or more embodiments of the present disclosure.

FIG. 6 illustrates a block diagram of a structure of an OSD 600 according to one or more embodiments of the present disclosure.

Referring to FIG. 6, the OSD 600 may include an Ethernet SSD 601 and a processor 602. In one or more examples, the Ethernet SSD 601 may include an Ethernet interface 6011. As understood by one of ordinary skill in the art, the Ethernet SSD 601 may also include other suitable components. For example, the Ethernet SSD 601 may also include a controller and a NAND flash memory.

In one or more examples, the processor 602 may be configured to receive data from an external device via the Ethernet interface 6011.

In one or more examples, the external device is another OSD or a monitor (or monitor node) of the Ceph system.

In one or more examples, the processor 602 may be configured to store the received data in the Ethernet SSD 601.

In one or more examples, the processor 602 may be configured to process the received data and store the processed data in the Ethernet SSD, and to store metadata for the received data in a memory of the processor.

In one or more examples, the processor 602 may be configured to transmit the processed data to a controller of the Ethernet SSD to store the processed data in a storage unit of the Ethernet SSD 601 by the controller.

In one or more examples, the processor is an advanced reduced instruction set computer (ARM) CPU.

In one or more examples, the processor 602 may be configured to execute an OSD daemon corresponding to the OSD 600 (or the Ethernet SSD 601) to perform at least one of data replication, data rebalancing, or heartbeat detection via the Ethernet interface.

According to one or more embodiments of the present disclosure, there is provided a Ceph system including: a plurality of object storage devices (OSDs), in which each of the plurality of OSDs includes an Ethernet solid state drive (SSD), the Ethernet SSD includes an Ethernet interface; and a processor embedded in the Ethernet SSD and configured to receive data from an external device via the Ethernet interface and to store the received data in the Ethernet SSD.

According to one or more embodiments of the present disclosure, there may be provided a computer-readable storage medium storing instructions, when executed by at least one processor, causing the at least one processor to perform the data storage method according to the present disclosure. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to one or more embodiments of the present disclosure, there may be provided a computer program product, wherein instructions in the computer program product may be executed by a processor of a computer device to implement the data storage method described herein.

Those skilled in the art will easily think of other embodiments of the present disclosure after considering the specification and practicing the disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The specification and the embodiments are to be regarded as exemplary only, and the actual scope and spirit of the present disclosure are pointed out by the following claims.

What is claimed is:

1. A data storage method performed by at least one processor of an object storage device (OSD) of a storage system, the method comprising:
   receiving data from an external device through an Ethernet interface of an Ethernet solid state drive (SSD) of the OSD, the at least one processor embedded in the SSD; and
   controlling a controller embedded in the SSD to store the received data in the Ethernet SSD,
   wherein the controlling the controller comprises:
      processing the received data to generate processed data;
      storing the processed data in the Ethernet SSD; and
      storing metadata associated with the received data in a memory of the processor of the OSD.

2. The method of claim 1, wherein the storing of the processed data in the Ethernet SSD comprises:
   transmitting the processed data to the controller of the Ethernet SSD that causes the Ethernet SSD to store the processed data in a storage unit of the Ethernet SSD by the controller.

3. The method of claim 1, wherein the processor is an Advanced Reduced Instruction Set Computer (ARM) CPU.

4. The method of claim 1, wherein the external device is another OSD or a monitor of the storage system.

5. The method of claim 1, further comprising:
   executing an OSD daemon corresponding to the OSD to perform at least one of data replication, data rebalancing, and heartbeat detection via the Ethernet interface.

6. An object storage device (OSD) of a storage system comprising:
   an Ethernet solid state drive (SSD) comprising an Ethernet interface, a processor embedded in the Ethernet SSD, and a controller embedded in the Ethernet SSD,
   wherein the processor is configured to:
      receive data from an external device through the Ethernet interface, and
      control the controller to store the received data in the Ethernet SSD,
   wherein the processor is further configured to control the controller to:
      process the received data to generate processed data;
      store the processed data in the Ethernet SSD; and
      store metadata associated with the received data in a memory of the processor of the OSD.

7. The OSD of claim 6, wherein the processor is further configured to transmit the processed data to the controller of the Ethernet SSD that causes the Ethernet SSD to store the processed data into a storage unit of the Ethernet SSD by the controller.

8. The OSD of claim 6, wherein the processor is an Advanced Reduced Instruction Set Computer (ARM) CPU.

9. The OSD of claim 6, wherein the external device is another OSD or a monitor of the storage system.

10. The OSD of claim 6, wherein the processor is further configured to execute an OSD Daemon corresponding to the OSD to perform at least one of data replication, data rebalancing, and heartbeat detection via the Ethernet interface.

11. A non-transitory computer readable medium having instructions stored therein, which when executed by a processor of an object storage device (OSD) of a storage system, cause the processor to execute a method comprising:
    receiving data from an external device through an Ethernet interface of an Ethernet solid state drive (SSD) of the OSD, the processor embedded in the SSD; and
    controlling a controller embedded in the SSD to store the received data in the Ethernet SSD
    wherein the controlling the controller comprises:
        processing the received data to generate processed data;
        storing the processed data in the Ethernet SSD; and
        storing metadata associated with the received data in a memory of the processor of the OSD.

12. The non-transitory computer readable medium of claim 11, wherein the storing of the processed data in the Ethernet SSD comprises:
    transmitting the processed data to a controller of the Ethernet SSD that causes the Ethernet SSD to store the processed data in a storage unit of the Ethernet SSD by the controller.

13. The non-transitory computer readable medium of claim 11, wherein the processor is an Advanced Reduced Instruction Set Computer (ARM) CPU.

14. The non-transitory computer readable medium of claim 11, wherein the external device is another OSD or a monitor of the storage system.

15. The non-transitory computer readable medium of claim 11, wherein the method further comprises:
    executing an OSD daemon corresponding to the OSD to perform at least one of data replication, data rebalancing, and heartbeat detection via the Ethernet interface.

* * * * *